Figure 1:
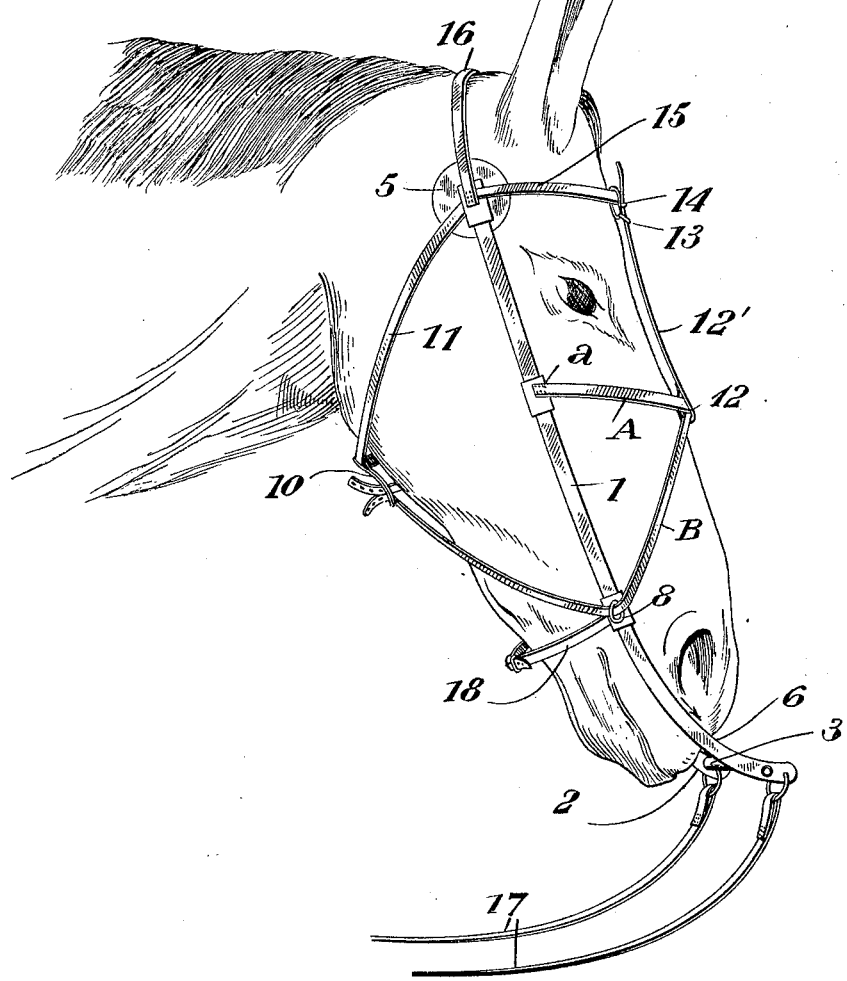

M. J. A. CHEDEVILLE.
BRIDLE.
APPLICATION FILED APR. 3, 1913.

1,102,474.

Patented July 7, 1914.
2 SHEETS—SHEET 1.

Witnesses:

Inventor:
Maurice Jules Alexandre Chedeville

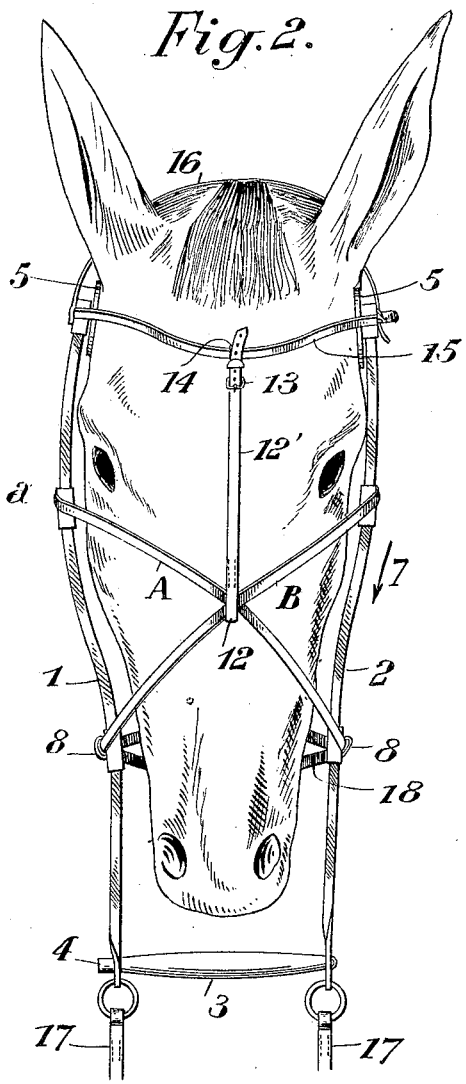

UNITED STATES PATENT OFFICE.

MAURICE JULES ALEXANDRE CHEDEVILLE, OF PARIS, FRANCE.

BRIDLE.

1,102,474.　　　　　　Specification of Letters Patent.　　Patented July 7, 1914.

Application filed April 3, 1913.　Serial No. 758,707.

*To all whom it may concern:*

Be it known that I, MAURICE JULES ALEXANDRE CHEDEVILLE, a citizen of the French Republic, and resident of Paris, France, have invented certain new and useful Improvements in Bridles Without Bit or Bridoon for Bridling a Horse or any other Animal of the Equine Species, of which the following is a specification.

It is a well established fact that in training and breaking colts, and especially high spirited animals, that a bit confuses the animal and is generally the cause of tender and sore mouths.

The present invention relates to bridles and particularly bitless bridles, which accomplish every result of a bitted bridle, without torture to the animal wearing the same.

With these and other objects in view, the invention consists of certain novel constructions, combinations, and arrangements of parts as will be hereinafter fully described and claimed.

In the drawings, Figure 1 is a side elevation of a horse's head, with a bridle constructed in accordance with my invention applied thereto, and Fig. 2 is a front elevation of the same.

The numerals 1 and 2 represent the side portions of the frame work which comprise suitable rigid material, the ends thereof terminating in a slightly curved portion which project beyond the nose of the animal wearing the bridle. A bar 3 of suitable rigid material is positioned between the extreme lower ends of the side bars 1 and 2 for holding the side bars in spaced relation when pressure is exerted on the frame in the event of the reins 17 which are connected to the rigid side bars, being drawn by the operator.

Suitably secured to the upper end of each of the side bars is a circular leather disk 5 which bears against the side of the horse's head below the ears, and it will be seen that the disks 5 are in such relation with the side bars 1 and 2 and the reins 17 that the slightest movement of the reins will result in a relative movement of the disks 5. The head stall 16 formed of suitable flexible material is connected to the side bars 1 and 2 at the ends thereof, and at a point where the front piece 15 joins the side bars, which as seen by Fig. 1 is directly over the leather disks 5. The jaw piece 11 constructed of suitable flexible material is also connected to the side bars 1 and 2 adjacent the leather disks, and carries a loop portion 10 for supporting the ends of the straps A and B to be hereinafter more clearly described.

The straps A and B which have one of their ends connected to the respective side bars 1 and 2, substantially centrally thereof, extend over the nose of the horse in opposite directions.

The connection strap 12' which connects the front strap 15 and nose straps A and B, is provided with a loop 14 and buckle 13 at one end and a loop portion 12 at the other end. As shown, the loop 12 supports the nose straps A and B which extend through the rings 8 positioned on the side bars 1 and 2, wherefrom the ends of the straps A and B extend through the loop 10 and are fastened. The strap 18 looped under the chin of the horse and having its ends secured to the side bars 1 and 2 forms the chin strap for preventing an animal from removing the bridle by pulling or jerking its head when tied by the reins.

In operation it will be seen that if a pull of either of the reins is exerted on the side bars 1 and 2 of the bridle, the horse's head is pressed at the points 12, 10 and 5 which is sufficient to gain complete control of the horse.

Having now fully described my said invention, what I claim and desire to secure by Letters Patent, is:

1. A bridle of the kind described comprising in combination, metallic side bars having the lower ends thereof curved forwardly and arranged to be connected to the reins, a cross bar connecting the side bars adjacent their lower ends, a head stall, means for connecting the side bars to the head stall, flexible straps for connecting the side bars, and disk members secured to the side bars for engaging the horse's head below the ears.

2. A bitless bridle comprising rigid side bars arranged to be connected to the reins, a rigid bar for connecting the side bars adjacent the lower ends thereof, flexible straps for connecting the said bars intermediate their length, and means adjacent the upper ends of the side bars for engaging the head of the animal to which the bridle is applied, when the reins are pulled.

In testimony whereof I have hereunto set my hand in presence of two witnesses.

MAURICE JULES ALEXANDRE CHEDEVILLE.

Witnesses:
    GASTON PETIAN,
    LUCIEN MEMMINGER.